United States Patent [19]

Brown

[11] 4,156,125

[45] May 22, 1979

[54] METHOD OF AND MEANS FOR SPACING CONTROL OF PLASMA ARC CUTTING TORCH INCLUDING VECTOR VELOCITY COMPENSATION

[75] Inventor: Ronald D. Brown, Mapleton, Ill.

[73] Assignee: Caterpillar Tractor Co., Peoria, Ill.

[21] Appl. No.: 772,397

[22] Filed: Feb. 28, 1977

[51] Int. Cl.² .............................................. B23K 9/10
[52] U.S. Cl. ............................ 219/124.02; 219/121 P; 228/8
[58] Field of Search ............... 219/121 P, 124, 125 R, 219/125 PL, 60 R, 124.02, 124.03; 228/102, 8, 9; 318/618

[56] References Cited

U.S. PATENT DOCUMENTS

| | | | |
|---|---|---|---|
| 3,207,407 | 9/1965 | Preston et al. ......................... | 219/124 |
| 3,373,914 | 3/1968 | Wall, Jr. .......................... | 219/125 PL |
| 3,624,343 | 11/1971 | Stjernstrom et al. ......... | 219/125 PL |
| 4,017,707 | 4/1977 | Brown et al. .......................... | 219/124 |

FOREIGN PATENT DOCUMENTS

1808074  6/1970  Fed. Rep. of Germany ........ 219/60 R

*Primary Examiner*—J. V. Truhe
*Assistant Examiner*—Clifford C. Shaw
*Attorney, Agent, or Firm*—Phillips, Moore, Weissenberger, Lempio & Majestic

[57] ABSTRACT

A method of automatically maintaining a selected spacing for a plasma arc cutting torch form a workpiece is disclosed which takes advantage of the fact that at any given setting of a plasma arc power supply the current in the arc varies inversely and the voltage across the arc varies directly in relation to the spacing of the plasma arc torch from the workpiece when new material in the workpiece is presented to the plasma arc at an essentially constant rate and which includes the step of automatically compensating for variations in the rate at which new material is presented to the arc.

11 Claims, 4 Drawing Figures

FIG_1

FIG_2

FIG_3

FIG_4

METHOD OF AND MEANS FOR SPACING CONTROL OF PLASMA ARC CUTTING TORCH INCLUDING VECTOR VELOCITY COMPENSATION

BACKGROUND OF THE INVENTION

This invention relates to an improved method of and means for controlling the height of a plasma arc cutting torch above a workpiece, and more particularly to such a method and means specifically designed to automatically compensate for variations in travel speed of the arc torch above the workpiece during actual operation.

The use of plasma arc torches to cut metal workpieces to a desired shape is known in the art. Thus, one or more plasma arc torches are mounted over a work table which supports the workpiece and appropriate apparatus is provided for moving the torch or torches over the surface of the workpiece in a plane generally parallel thereto to enable the cutting of the workpiece to the desired shape.

However, in such apparatus, movement of the torch or torches along the desired path in a plane parallel to the workpiece is normally controlled by a tape program which must take into account both the configuration of the cut and the mechanical limitations of the apparatus. In order for the torch to follow the desired path, its drive mechanism must be controlled in both the X axis and the Y axis of the plane parallel to the workpiece, causing the torch to move in a given vector and at a given velocity dependent upon the relative speed of the X axis and the Y axis drives.

When the given velocity of the torch with respect to the workpiece is high, as it would be when cutting thinner plates, mechanical considerations tend to require that such velocity be substantially reduced when negotiating sharp turns since very large forces tend to be associated with an abrupt vector change resulting in a deflection of the torch from the desired path. Thus, if the velocity is not reduced, the cut would tend to be inaccurate or the torch drive components would tend to be overstressed. Even in plasma arc cutting apparatus with mechanically sturdy drive components, long periods of use and resultant wearing or drive components will tend to cause the torch to overshoot the desired cutting path during sharp turns if velocity is not reduced. Accordingly, the velocity of the torch with respect to the workpiece must be controlled with the limitations of the particular apparatus in mind in order to maintain the desired cutting path.

The prior art discloses systems in which signals representative of arc voltage and arc current are utilized to maintain a preselected spacing between the torch and workpiece by moving the torch toward or away from the workpiece (i.e. along a Z axis perpendicular to the plane parallel to the workpiece). Thus, where the torch is at the desired spacing, the voltage and current signals are representative of the proper spacing and the torch will not move closer to or further from the surface of the workpiece during a cutting operation so long as the velocity at which the torch is moved over the surface of the workpiece is not reduced below that which is just sufficient to enable the cutting of the workpiece.

The result of reducing the vector velocity of the torch in negotiating sharp turns is that new material will be presented to the arc at a reduced rate. When this occurs, molten material will be blown clear of the cut and the arc can blossom through the cut permitting the arc to extend to the work table underlying the workpiece. The resultant increase in arc length will increase arc resistance thus reducing arc current and increasing arc voltage. These conditions would be interpreted by the control systems of the prior art as an indication of excessive torch-to-workpiece spacing and the torch would tend to be driven toward the workpiece. Damage to the torch or the workpiece or both would result but for safety devices which may be built into the system to inactivate it where an excessive change in torch-to-workpiece spacing is called for.

SUMMARY OF THE INVENTION

The present invention is directed to overcoming one or more of the problems set forth above. According to this invention, a signal representative of the vector velocity of the torch and comparable signals representative of the arc current and voltage are generated, properly polarized and summed with each other and with an offset signal to produce a zero control signal at the desired spacing and selected vector velocity between the torch and workpiece. Thus, as long as vector velocity is constant, the spacing between the torch and workpiece is controlled by the voltage-current relationship as disclosed in prior art systems. When the vector velocity decreases, however, the signal representative thereof will be changed in proportion to changes which occur in the signals representative of arc current and arc voltage when new material is presented to the arc at a reduced rate. Thus, the torch will not tend to be moved by the automatic control system during periods of reduced vector velocity unless a change in the spacing between the torch and workpiece occurs for some other reason such as an elevation of the surface of the workpiece toward the torch due to warping of the workpiece, for example.

Briefly, according to this invention, a selected spacing between a plasma arc torch and the work surface of a workpiece is maintained after an arc has been established therebetween and during movement of such arc along the surface of the workpiece at varying velocities by electrically sensing the voltage and current present between the workpiece and the torch and generating comparable first and second electrical signals representative of each respectively. One of such first and second electrical signals is electrically inverted with respect to the other and a third electrical signal representative of the velocity of movement of the plasma arc along the surface of the workpiece is generated which is comparable to such first and second electrical signals and has opposite sense but the same sign as one of such first and second electrical signals. The first, second and third electrical signals are then electrically summed with each other and with a fourth comparable electrical signal. The fourth comparable electrical signal is selected to be equal in magnitude and opposite in sign to the sum of the first, second and third electrical signals at the desired torch spacing and velocity in order to produce an electrical control signal representative of any net change which may occur in the sum of the first, second, third and fourth electrical signals. The control signal is applied to electromechanical means coupled to the plasma arc torch to move the plasma arc torch toward the selected spacing from the work surface in response to the control signal. The means for practicing the invention includes a DC power supply connected between the torch and the workpiece, means for sensing the output current and voltage of the power supply to generate comparable first and second electrical signals representative thereof, means for inverting one of said first and second electrical signals with respect to the other, means for generating a third electrical signal representative of the velocity of movement of the plasma arc torch with respect to the surface of the workpiece, means for generating a fourth electrical signal equal in magnitude and opposite in sign to the sum of said first, second and third electrical signals at a desired torch spacing and velocity, means for summing the first, second and third electrical signals with each other and with the fourth electrical signal to produce an electrical control signal, electromechanical means for moving the plasma arc toward and away from the surface of the workpiece, and means for applying the control signal to the electromechanical means to cause the plasma arc torch to move toward the selected spacing thereof from the surface of the workpiece upon any net change in the sum of the first, second, third and fourth electrical signals.

BRIEF DESCRIPTION OF THE DRAWING

The foregoing and other objects and features of the subject invention will be more clearly apparent from a reading of the following description of a preferred embodiment of this invention in conjunction with the attached drawing wherein.

DESCRIPTION OF PREFERRED EMBODIMENT

Figure 1:
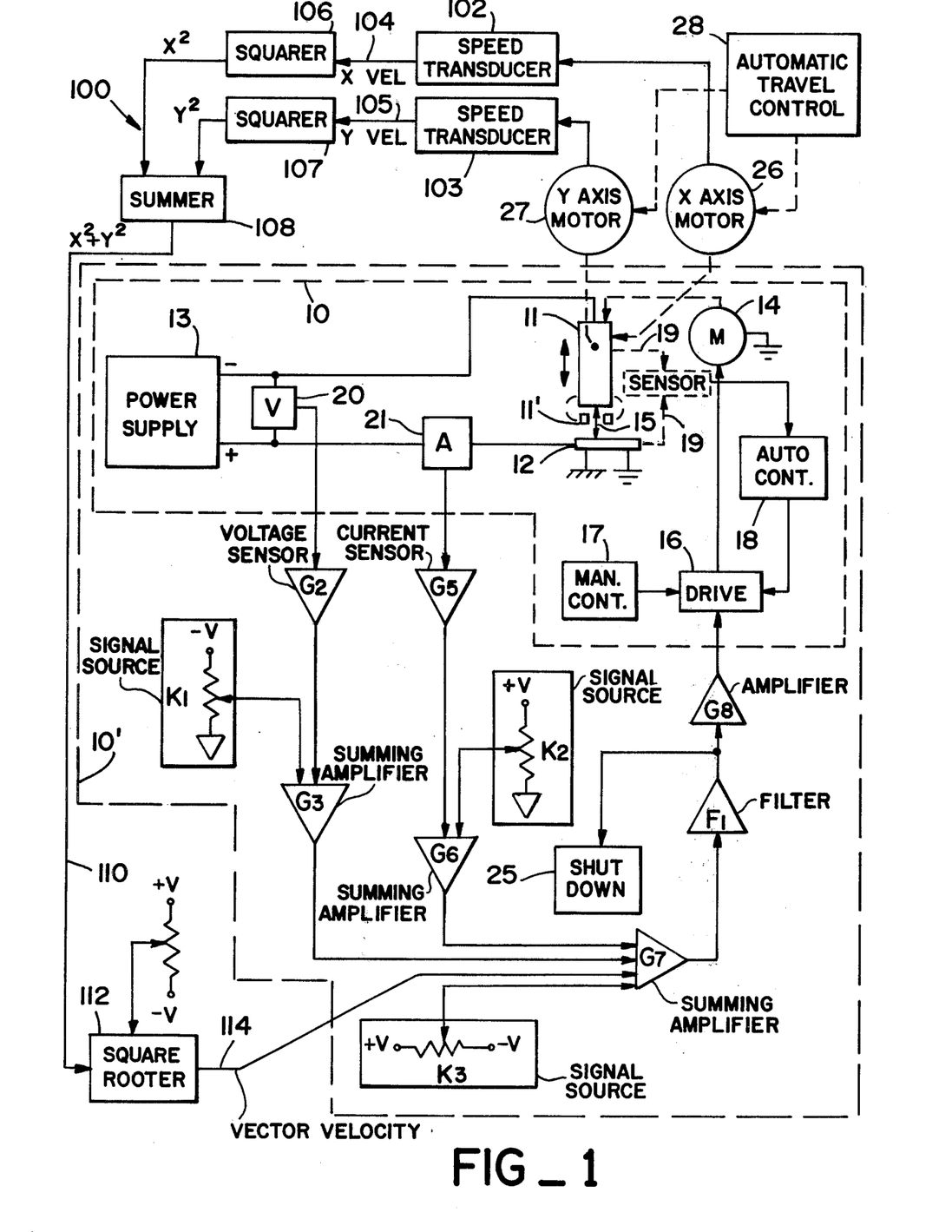
FIG. 1 is a functional block diagram of a preferred embodiment of the method and means of this invention as applied to a plasma arc torch cutting system.

Referring to FIG. 1, a block diagram of the electrical elements of a conventional plasma arc cutting torch system is shown within the dotted lines 10. Thus, a conventional plasma arc torch 11 is shown spaced from the surface of a workpiece 12 with the torch 11 and the workpiece 12 each electrically connected to a different one of the output leads of a conventional commercially available DC power supply 13. The spacing between the torch 11 and the surface of the workpiece 12 is mechanically established by an electromechanical device such as a servomoter 14 mechanically connected therebetween. The torch 11 may include a starter electrode 11' insulated from the body thereof and to which a high voltage, high frequency pulse may be applied with respect to the main body of the torch 11 from a source (not shown in FIG. 1) to ignite the plasma arc. Once the plasma arc has been ignited between the body of the torch 11 and the starter electrode 11', it will be transferred to the workpiece 12 by the DC voltage established by the power supply 13 across the gap 15 between the torch 11 and the workpiece 12. DC current flow through the plasma arc across the gap 15 will maintain the arc to produce heating of the workpiece 12 and enable the desired cutting operation to be performed thereon.

It will be understood that the plasma arc torch 11 is connected to a pressurized source of a selected gas (not shown) for establishing a flow of such gas across the gap 15 between the torch 11 and the workpiece 12 in which the plasma arc is formed. Such gas may be selected to provide an oxidizing action in performing cutting operations or an inert gas, or a gas having some other particular property, may be selected for use in performing other operations. Commercially available machines also provide means (not shown) for stabilizing the arc and for muffling the noise made by the arc in operation, using a water or gas sheath for example.

As pointed out hereinabove, the quality of the cut to be performed by the plasma arc torch 11 is dependent upon the establishment and maintenance of the proper DC power output from the power supply 13, the proper gas flow through the torch 11 and the proper spacing or gap 15 between the torch 11 and the surface of the workpiece 12. Thus, the power supply 13 of commercially available plasma arc torch systems is provided with appropriate controls (not shown) for setting the power supply 13 to provide a given percentage of rated power output and appropriate valves are provided at the pressurized source of gas (not shown) for setting a given gas flow through the torch 11. Similarly, a means for setting the spacing 15 between the torch 11 and the workpiece 12 comprising an electrical means 16 for driving the servomotor 14 and a manual control 17 for the driving means 16 is provided in commercially available plasma arc torch systems 10.

The plasma arc torch system 10 may also include a prior art automatic spacing control 18 electrically connected to the driving means 16 and including sensors physically and mechanically associated with the torch 11 and workpiece 12, as indicated by the dotted lines 19. However, it has been found that such prior art automatic spacing control means 18 become substantially inoperative once the plasma arc between the torch 11 and the workpiece 12 has been ignited and the functional blocks outside the dotted line 10 but inside dot-dash lines 10' show a prior art method of and means for automatically controlling the spacing between the torch 11 and the workpiece 12 after the arc has been ignited and without relying on the mechanical sensing indicated by dotted lines 19.

As shown within the dotted line 10 in FIG. 1, conventional plasma arc systems include a voltmeter 20 connected across the output leads of the power supply 13 and an ammeter 21 interposed in one of the output leads of the power supply 13. Thus, in operation, the output of the power supply 13 is manually set to the value required to perform the desired operation on a particular workpiece. It will be understood that the thickness of the workpiece and the heating thereof required to perform the desired operation, as well as the desired processing time, all enter into determining the value of the percentage of rated output to which the power supply is set. The actual heating of the workpiece 12 is, of course, a function of the current flow through the plasma arc at the particular power setting and such current flow as indicated by the ammeter circuit 21 will be a function of the particular power supply 13, the particular plasma arc torch 11, and the particular gas used as well as its pressure. The spacing or gap 15 between the torch 11 and the workpiece 12 is set for maximum energy transfer to the workpiece at the appropriate power output setting of the power supply and the velocity of movement of the torch over the workpiece is set so that new material is constantly presented for cutting. Once the system has been properly adjusted for the performance of a particular cutting operation on the workpiece 12, it is only necessary to maintain the proper velocity and spacing gap 15 to insure efficient operation of the system. It will be understood that if the workpiece 12 is warped or has an uneven surface, the length of such gap 15 will be subject to change in operation.

The current flow through the plasma arc will vary inversely with the length of the gap 15 established by the spacing of the torch 11 from the workpiece 12 while the power supply voltage is directly proportional to gap length. According to the teaching of the prior art as shown within the dot-dash lines 10' in FIG. 1, the output voltage of the power supply 13 is sensed by a first means indicated by the block $G_2$ connected across the output leads of the power supply 13 in conjunction with the voltmeter 20 and the current flow through the plasma arc is sensed by a second means indicated by the block labeled $G_5$ connected in one of the output leads in conjunction with the ammeter 21. The sensor means $G_5$ and $G_2$ are each adapted to produce an electrical signal representative of the current and voltage, respectively, sensed thereby and one of such means is adapted to produce an electrical signal of inverted sign with respect to the electrical signal produced by the other such means.

According to the specific embodiment of this invention to be described herein, the electrical signal produced by the sensor $G_2$ is a negative voltage that becomes more negative as the voltage output of the power supply 13 increases, whereas the electrical signal produced by the sensor $G_5$ is a positive voltage that becomes more positive as the current flow through the plasma arc increases. It will be understood that the input to the sensor $G_2$ will differ greatly in magnitude from the input to the sensor $G_5$. However, in accordance with the method of this invention, it is necessary that the signal representative of the output voltage of the power supply be comparable in magnitude to the signal representative of the current which passes through the plasma arc both with respect to a common reference. To this end the signal produced by the sensor $G_2$ is summed with a reference signal from a source $K_1$ in summing amplifier $G_3$. Similarly, the signal produced by the sensor $G_5$ is summed with a reference signal provided by a source $K_2$ in summing amplifier $G_6$. The reference signals provided by sources $K_1$ and $K_2$ are large in relation to the signals produced by sensors $G_2$ and $G_5$ but comparable to each other in terms of magnitude although of opposite sign and thus the signals produced by summing amplifiers $G_3$ and $G_6$ will tend to cancel each other out when summed with each other in summing amplifier $G_7$.

A further reference signal from source $K_3$ having a sign corresponding to that of the signal from one of the summing amplifiers $G_3$ and $G_6$ is summed with the signals from $G_3$ and $G_6$ in summing amplifier $G_7$. The sources $K_1$, $K_2$ and $K_3$ of reference signals are all related to each other and in fact, as will be more fully described hereinafter, all have a common source or power supply. Thus, the reference signal supplied by source $K_3$ will be comparable to the summed signals from summing amplifiers $G_3$ and $G_6$ and, ignoring for the moment the further input to summing amplifier $G_7$ according to the teaching of this invention, the source $K_3$ may be set to provide a signal for summing with the signals from $G_3$ and $G_6$ in summing amplifier $G_7$ which will result in there being no output signal from summing amplifier $G_7$ when the torch 11 is at the desired spacing from the workpiece 12. If the spacing between the torch 11 and workpiece 12 should change for any reason, an output signal from $G_7$ would result which output signal would have opposite signs depending upon whether the spacing increased or decreased from the desired spacing.

The output of summing amplifier $G_7$ passes through a filter $F_1$ and is further amplified in amplifier $G_8$. The output of amplifier $G_8$ is used to control the electrical drive circuit 16 for the servomotor 14 which in turn controls the spacing between the plasma arc torch 11 and the workpiece 12. The filter circuit $F_1$ is adapted to remove AC components in the output of the amplifier $G_7$ and to activate a circuit 25 designed to shut down the operation of the plasma arc torch system 10 if such output changes radically.

Thus, assuming that the power supply 13 has been set to provide a given output, an amplified signal proportional to the voltage across gap 15 will be produced by the amplifier $G_3$ and applied to the summing amplifier $G_7$. A given current flow will occur through the arc, the magnitude of which will be a function of and inversely proportional to the length of the gap 15 between the torch 11 and workpiece 12 and an amplified signal representative of the magnitude of such current flow will be applied to the summing amplifier $G_7$ by the amplifier $G_6$. Since the amplified signal produced by amplifiers $G_3$ and $G_6$ are comparable to each other, it is possible that the two signals will be exactly equal to each other and will cancel each other out in summing amplifier $G_7$. In this case, an electrical output signal will be produced by summing amplifier $G_7$ proportional to the full amount of the reference signal applied thereto from source $K_3$. Such signal will be amplified by $G_8$ and through the action of the driver circuit 16 and servomotor 14 will cause the torch 11 to move either toward or away from the workpiece 12. However, as soon as the torch 11 moves with respect to the workpiece 12, the current and voltage of the arc will change in opposing relationship depending on the direction of such movement. Such change in the current and voltage of the plasma arc will change the magnitude of the amplified signals supplied by amplifiers $G_3$ and $G_6$ to the summing amplifier $G_7$ and will therefore change the electrical output signal supplied by the amplifier $G_7$ for amplification in $G_8$.

In actual operation, the desired spacing between the plasma arc torch 11 and the workpiece 12 is set manually. The reference signals provided by sources $K_1$, $K_2$ and $K_3$ are then adjusted so that the difference between the amplified signals applied to summing amplifier $G_7$ by amplifiers $G_3$ and $G_6$ is equal to the reference signal applied to summing amplifier $G_7$ by the source $K_3$ resulting in the absence of any output signal to the amplifier $G_8$ from the summing amplifier $G_7$. Let us now consider the amplified signal produced by amplifier $G_3$ representative of the output voltage of the power supply 13 to be a "negative" signal becoming more negative as the output voltage of the power supply 13 increases and the amplified signal produced by amplifier $G_6$ representative of the current flow in the plasma arc to be a "positive" signal, becoming more positive as such current increases. Let us further consider the reference signal supplied by the source $K_3$ to be a "positive" signal. Thus, if the current flow through the arc increases, the positive signal applied to the summing amplifier $G_7$ by the amplifier $G_6$ will increase and the negative signal from amplifier $G_3$ will go less negative. This results in the output of a positive signal from the amplifier $G_7$. On the other hand, if the current flow in the arc decreases, the positive signal applied to the junction 24 by the amplifier $G_6$ will decrease and the negative signal from the amplifier $G_3$ will go more negative. This results in a negative output signal from the amplifier $G_7$. The drive circuitry 16 may then be adapted so that the application of a negative signal from the amplifier $G_7$ for further amplification by amplifier $G_8$ will result in the servomotor turning in the proper direction to decrease the spacing between the torch 11 and the workpiece 12, whereas the application of a positive signal to the drive circuit 16 through amplifiers $G_7$ and $G_8$ will result in the servomotor 14 turning in the proper direction to increase the spacing between the torch 11 and the workpiece 12. Thus, once the proper spacing between the torch 11 and the workpiece 12 has been established and the arc initiated, any change in such spacing will cause the torch to be moved with respect to the workpiece toward the proper spacing therebetween.

It has been found that the torch to workpiece spacing for optimum productivity (i.e., high torch travel speed) and trueness of the cut will differ in different plasma arc systems dependent upon the characteristics of the particular plasma arc cutting torch and the system itself. For example, testing has determined that the plasma arc cutting torch and system in predominant use by applicant performs best at ⅜ inch (9.5 mm) spacing between the torch and workpiece. If the spacing is reduced, the quality of the cut deteriorates and unacceptable cuts result if the clearance is reduced to approximately 1/16 inch (1.6 mm). Such optimum spacing is independent of the thickness of the workpiece to be cut throughout a substantial range of thicknesses although it is possible to cut thinner workpieces at a higher rate than workpieces of greater thickness.

Thus, for optimum productivity, the travel speed of the torch with respect to the workpiece is set so that new material is presented to the torch for cutting at a constant rate which will be dependent upon the thickness of the workpiece. If the travel speed or vector velocity of the torch with respect to the workpiece is too high for a workpiece of given thickness, the cut will be incomplete and if the travel speed or vector velocity of the torch with respect to the workpiece is too low for a workpiece of given thickness, the plasma arc will blossom through the cut which will not only result in inefficient cutting action but will also tend to interfere with the desired operation of the automatic spacing control as described hereinabove in maintaining the optimum spacing between the torch 11 and the workpiece 12.

It is conventional in the prior art to move the torch over the surface of the workpiece by an appropriate motor driven mechanism adapted to simultaneously move the torch along two perpendicular axes in a plane substantially parallel to the plane of the surface of the workpiece. Thus, in FIG. 1, an electric motor 26 is shown which is mechanically coupled to the torch 11 to drive it along a particular axis, (hereinafter referred to as the X axis) in the plane substantially parallel to the surface of the workpiece 12. A second electric motor 27 is shown which is mechanically coupled to the torch 11 as indicated by a dotted line to drive the torch 11 along an axis (hereinafter referred to as the Y axis) which is perpendicular to the X axis. By proper adjustment of the rotational speeds of the motors 26 and 27 with respect to each other, the torch 11 may be moved along any selected vector at a selected velocity. Thus it is known in the prior art to utilize an automatic travel control device as indicated by the box 28 appropriately interconnected with the motors 26 and 27 by the dotted arrows representing relative speed control of the motors 26 and 27. For example, the automatic travel control 28 might be a tape control known in the art capable of varying the relative speeds of the motors 26 and 27 to cause the torch 11 to follow a predetermined path or pattern at a predetermined velocity.

However, applicant has found that it is physically impossible to maintain the relatively high velocity of torch travel required for optimum productivity constant where the torch 11 is moved along a path that includes relatively abrupt changes in direction. Inertial forces will be present in any change in direction due to the mass of the torch and the mechanical elements of the mechanism for moving it over the surface of the workpiece. Even in a new machine which is properly designed to withstand the inertial forces involved, it is necessary to reduce the velocity of the torch at least slightly even when the change in direction is made on a radius. Where an abrupt change in direction at a sharp angle (i.e., 30° or more) is required, it is necessary to reduce the vector velocity of the torch at least momentarily by a substantial amount. Where the machine is not designed to withstand the inertial forces involved in changes in direction of the vector velocity of the torch with respect to the workpiece, the automatic travel control must be programmed to provide for additional reductions in velocity upon a change in direction of the movement of the torch in order to insure that the proper cutting path will be accomplished. In any such mechanism which has been subjected to extensive use, component wear will also contribute to the necessity for reducing the vector velocity of the torch in connection with changes in direction thereof in order to provide acceptable cuts.

Whenever the vector velocity of the torch is reduced from its optimum value for the thickness of the workpiece being cut, the arc will tend to blossom through the workpiece and the spacing control apparatus described hereinabove will sense the increased length of the arc and will interpret it as an increase in the spacing between the torch and the workpiece. Thus the apparatus described hereinabove will tend to move the torch toward the workpiece whenever the vector velocity is reduced from its optimum value. but for the teaching of this invention, this would result in a reduction in the spacing between the torch and the workpiece and a poor quality of cut at and about the point where the change in direction occurs.

According to the teaching of this invention, an electrical signal is derived from the drive mechanism which moves the torch which electric signal is proportional to the vector velocity of the torch. Such vector velocity signal is conditioned so that it is the opposite of the control signal which would result from an increase in the spacing between the torch and the workpiece. The vector velocity signal is then summed with the arc voltage signal and the arc current signal in the automatic torch spacing control apparatus. Thus when the vector velocity of the torch decreases and the plasma arc blossoms through the workpiece causing the automatic torch spacing control to sense an increase in arc spacing the resulting signal which would tend to drive the torch toward the workpiece will be counteracted by the velocity vector signal and the torch will tend to remain at its preselected spacing from the workpiece even under conditions of low vector velocity of the torch.

A functional diagram of a preferred embodiment of this invention for generating the vector velocity signal is shown outside the dot-dash line 10' in FIG. 1. According to this embodiment 100 of the invention, a pair of speed transducers 102 and 103 are each mechanically coupled to the drive shaft of a different one of the motors 26 and 27 respectively. The speed transducers 102 and 103 are each adapted to produce an electric signal proportional to the rotational speeds of the drive shafts of the motors 26 and 27 respectively and may each comprise, for example, a direct current tachometer known in the art mounted for rotation by their respective drive shafts. Thus the output of the speed transducers 102 and 103 on leads 104 and 105, respectively, are DC voltages proportional to the speeds of motors 26 and 27, respectively.

The signals on leads 104 and 105 are multiplied in squaring circuits 106 and 107, respectively, and the outputs of the squaring circuits 106 and 107 provide the inputs to a summing circuit 108. Thus the output on the lead 110 from the summing circuit 108 is a signal representative of the sum of the squares of the rotational speeds of the motors 26 and 27. The signal on the lead 110 serves as the input to a square root circuit 112.

The output of the square root circuit 112 on the lead 114 is representative of the square root of the sum of the rotational speeds of the motors 26 and 27 and is thus truly representative of the vector velocity of the torch 11 as moved by the motors 26 and 27. The signal on the output lead 114 of the square root circuit 112 is conditioned to be a negative signal going less negative as the vector velocity of the torch decreases.

As shown in FIG. 1, the signal on the output lead 114 of the square root circuit 112 is connected as an input to the summing amplifier $G_7$ together with the outputs of summing amplifiers $G_3$ and $G_6$ as well as signal source $K_3$.

As explained hereinabove, the output of summing amplifier $G_3$ is a negative voltage going more negative as the spacing between the arc torch and the workpiece increases, thereby increasing the voltage across the arc. The output of the summing amplifier $G_6$ is a positive voltage going less positive as the spacing between the torch and workpiece increases, resulting in a decrease in arc current. Since the output of the square root circuit 112 on lead 114 is negative voltage going less negative as the vector velocity of the torch decreases, it will be seen that such signal will counteract the effects of a lengthening arc produced by blossoming of the arc through the workpiece when the vector velocity of the torch is reduced below the optimum velocity. Thus the signal from signal source $K_3$ is selected to cancel the summation of the voltage signal from summing amplifier $G_3$ the current signal from summing amplifier $G_6$ and the vector velocity signal from the square root circuit 112. A decrease in the vector velocity will decrease the negative signal output of the square root circuit 112 but at the same time the reduction in vector velocity will tend to cause a blossoming of the arc through the workpiece and a resultant increase in the negative voltage signal from summing amplifier $G_3$ and a decrease in the positive current signal from the summing amplifier $G_6$. The net result will be that the change in the vector velocity signal will tend to counteract the sum of the changes in the voltage and current signals and there will tend to be no control signal produced by the summing amplifier $G_7$ thus maintaining the selected spacing of the torch from the workpiece.

However, if the spacing between the torch and the workpiece should change during a period of reduced vector velocity of the torch due to warping of the workpiece, for example, then the further change in the voltage and current signals corresponding to the change in spacing would tend to result in the normal operation of the control circuit according to the teaching of the prior art. It will be noted that the desired maximum vector velocity of the torch is set by the automatic travel control and that no increase in such vector velocity above the preset maximum occurs although it is necessary to reduce the vector velocity in operation.

Figure 2:
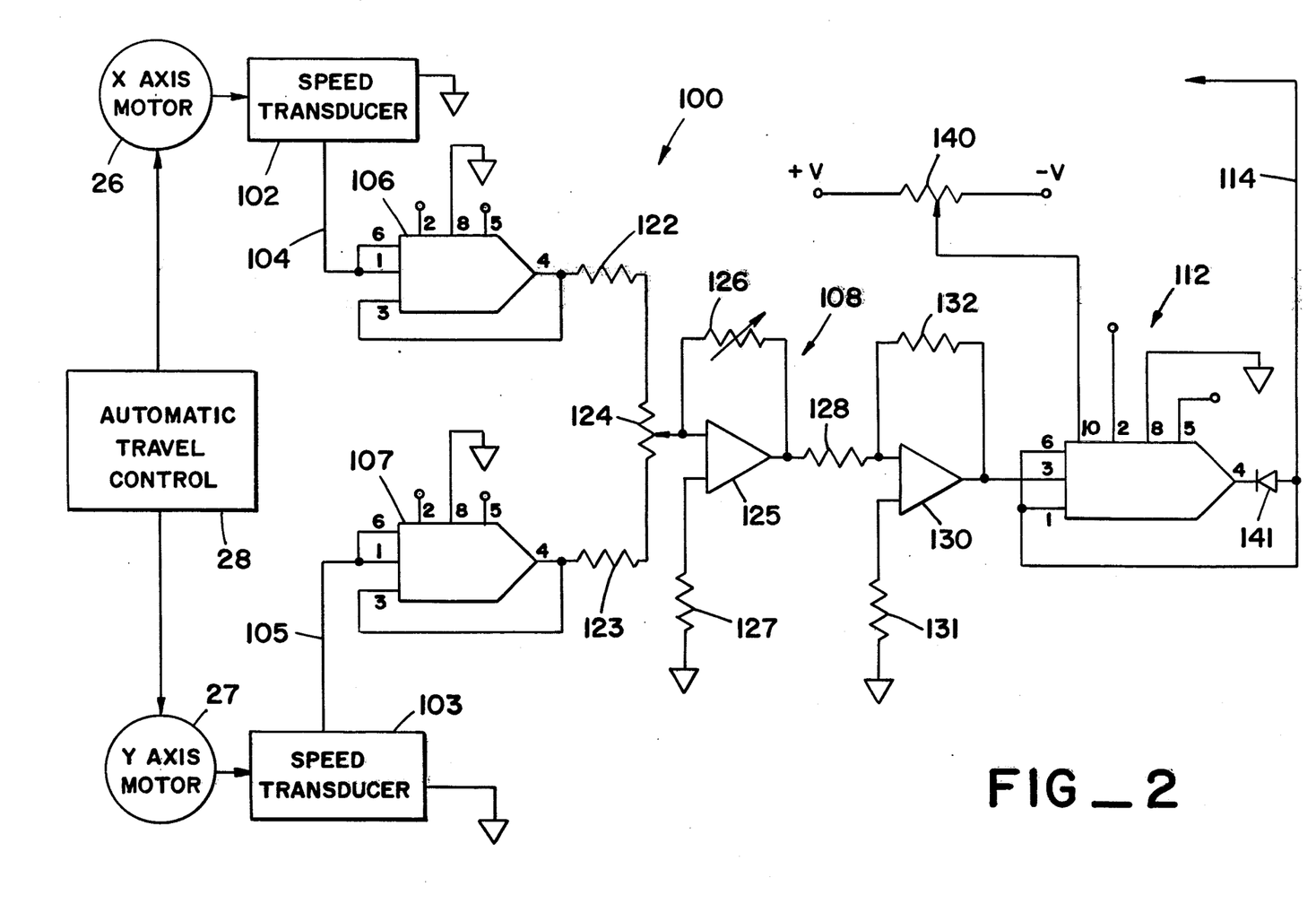
FIG. 2 is a schematic diagram of a preferred embodiment of the means of this invention for use with plasma arc torch cutting systems in which drive motors are used to provide X axis and Y axis movement of the plasma torch and wherein a vector velocity signal is derived from the relative rotational speeds of such drive motors.

A schematic diagram of the electronic circuitry of the embodiment 100 of this invention shown in FIG. 1 is presented in FIG. 2. The reference numerals of FIG. 1 are used to identify like parts in FIG. 2 for ease of understanding and the automatic travel control 28, motors 26 and 27, and speed transducers 102 and 103 are shown in block diagram form.

As shown in FIG. 2, the squaring circuits 106 and 107 may be "Burr-Brown 4203" multipliers connected to square their inputs. The outputs 104 ad 105 of the speed transducers 102 and 103, respectively, are connected as the input to the multipliers 106 and 107 respectively.

The outputs of the multipliers 106 and 107 are balanced by proper selection of output resistors 122 and 123 and by proper adjustment of the potentiometer 124 so that they will equal each other when the motors 26 and 27 have identical rotational speeds. The outputs of the multipliers 106 and 107 are connected through the potentiometer 124 to the input of the summing circuit 108 which comprises summing amplifier 125 together with feedback potentiometer 126 and bias resistor 127. The feedback potentiometer 126 may be adjusted to provide an appropriate gain for the summing circuit 108. The output of the summing circuit 108 is applied to the input of an amplifier 130 through an output resistor 128. The amplifier 130 together with bias resistor 131 and feedback resistor 132 serve as an inverter to present the proper polarity signal to the input of the square rooting circuit 112. The square rooting circuit 112 may also comprise a "Burr-Brown 4203" multiplier connected to operate as a square rooter as shown. The square rooting circuit 112 includes a potentiometer 140 which is connected to provide either a positive or a negative offset voltage to the multiplier in order to minimize errors when the input from the amplifier 130 is at a low value. The square rooting circuit 112 also includes a diode 141 in the output circuit with the lead 114 indicating the vector velocity output signal of the square rooting circuit 112.

Figure 3:
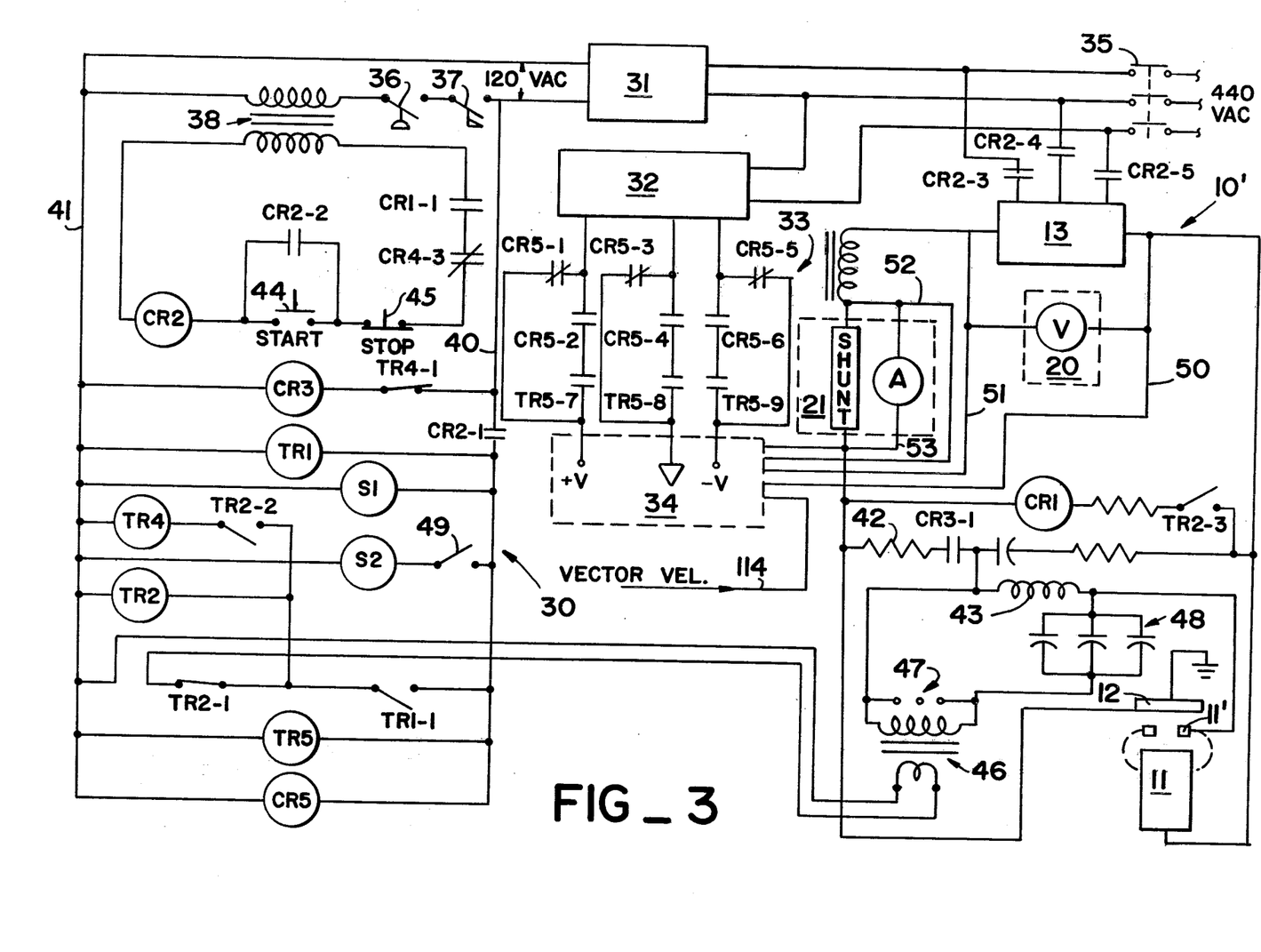
FIG. 3 is a wiring diagram for a plasma arc cutting torch systems as adapted to include a means for practicing the method of torch spacing control according to the teaching of this invention with certain elements of the system shown schematically and others shown in block form.

Referring to FIG. 3, a wiring diagram showing the electrical interconnection of the plasma arc torch system 10' of FIG. 1 is presented with the vector velocity input according to the preferred embodiment of this invention shown at 114. Thus, the torch 11, workpiece 12, plasma arc power supply 13, voltmeter 20 and ammeter 21 of FIG. 1 are shown in FIG. 3.

But for the showing of the vector velocity output lead 114 from the square rooting circuit 112 (FIG. 2) according to this invention, the apparatus shown in FIG. 3 is identical to that shown in FIG. 2 of allowed U.S. patent application Ser. No. 529,324 assigned to Caterpillar Tractor Company, the teaching of which is incorporated herein by reference. The reference numerals of FIG. 3 correspond to the reference numerals of FIG. 2 of U.S. patent application Ser. No. 529,324 for ease of understanding. For example, the plasma arc sequence control 30 and its power supply 31 and the electronic control circuit 34 and its power supply 32 are of particular interest in connection with the invention of this application.

Figure 4:
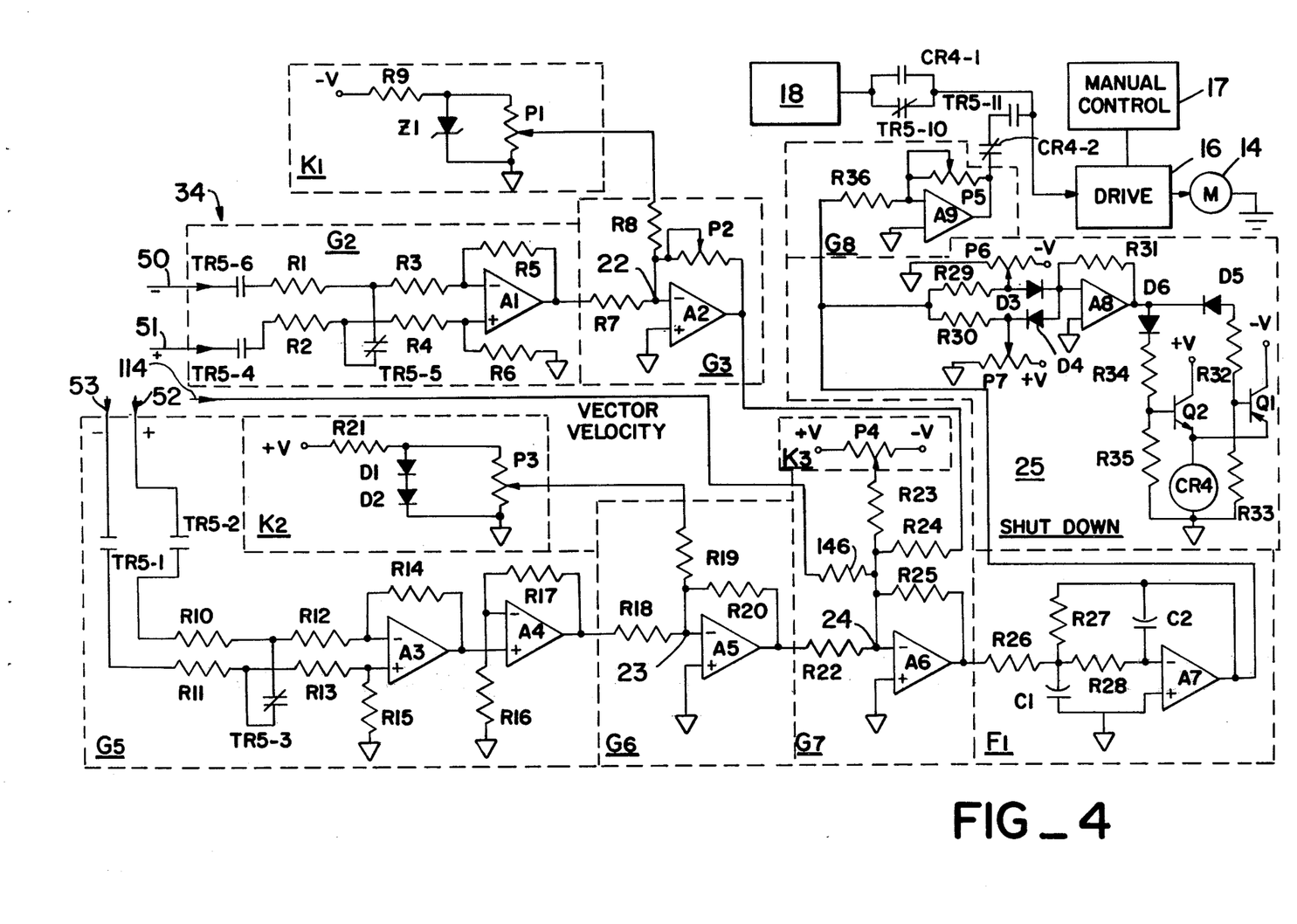
FIG. 4 is a schematic diagram of a preferred embodiment of the means for practicing this invention with certain conventional elements of the plasma arc cutting torch system shown in block form and with the input from the schematic diagram of FIG. 2 indicated according to the teaching of this invention.

Thus, it will be seen that according to the preferred embodiment of the invention the output lead 114 from the square rooting circuit 112 seves as an additional input to the electronic control circuit 34. Referring to FIG. 4, the electronic control circuit 34 and the interconnection of the output lead 114 from the square rooting circuit 112 with the electronic control circuit 34 is shown in schematic form. But for the showing of the vector velocity output lead 114 from the square rooting circuit 112 (FIG. 2) and the additional resistor 146 in the summing circuit G7, the schematic diagram of FIG. 4 is the same as that shown in FIG. 3 of the above mentioned allowed U.S. patent application Ser. No. 529,324, the teaching of which is incorporated herein by reference. The reference numerals of FIG. 4 correspond to the reference numerals of FIG. 3 of U.S. patent application Ser. No. 529,324 for ease of understanding.

Referring again to FIG. 3, it will be seen that the power supply 32 for the electronic circuit 34 provides a ground as well as a positive and a negative voltage. Such ground and such positive and negative voltages are preferably also utilized in the embodiment 100 of the teaching of this invention as shown in FIG. 2 in order to render the various arc current, arc voltage and vector velocity signals suitably comparable to each other.

It is believed that the teaching of this invention may be utilized by those skilled in the art in conjunction with plasma arc control systems other than that specifically shown and described by reference herein.

The embodiments of the invention in which an exclusive property or privilege is claimed are defined as follows 1. In a method of automatic control by means of a control signal of the spacing of a plasma arc cutting torch from a workpiece during movement of said torch through a path in a plane substantially parallel to the surface of said workpiece at vector velocities equal to and less than a given maximum vector velocity with respect to said workpiece, the improvement comprising the steps of generating a signal representative of the vector velocity of said torch and generating comparable signals representative of the plasma arc current and plasma arc voltage, properly polarizing all of said signals with respect to each other and summing all of said signals with each other and with a selected offset signal to produce a zero control signal at a selected spacing and said given maximum vector velocity between said torch and said workpiece and changing said signal representative of vector velocity in response to a decrease in said vector velocity in inverse sense to changes which occur in the sum of said signals representative of arc current and arc voltage when said vector velocity decreases, whereby said zero control signal will tend to be maintained unless a change occurs in said spacing of said torch from the surface of said workpiece.

2. The improvement claimed in claim 1 wherein said signal representative of the vector velocity of said torch is generated by sensing the velocity of movement of said torch in a first direction and generating a first signal directly proportional thereto, sensing the velocity of movement of said torch in a second direction perpendicular to said first direction and generating a second signal directly proportional thereto, squaring said first and second signals, summing said squared first and second signals and taking the square root of said squared and summed first and second signals to produce said signal representative of the vector velocity of said torch.

3. The improvement claimed in claim 2 wherein the signal representative of the plasma arc voltage is a negative voltage that becomes more negative as said plasma arc voltage increases, the signal representative of the plasma arc current is a positive voltage that becomes less positive as the plasma arc current decreases, and the signal representative of the vector velocity of said torch is a negative voltage becoming less negative as the vector velocity of said torch decreases.

4. The method of automatically maintaining a selected spacing of a plasma arc torch from the work surface of a workpiece during movement of said torch along said work surface at velocities equal to and less than a given velocity comprising the steps of:
(a) establishing a plasma arc between said surface and said plasma arc torch at said selected spacing by means of a plasma arc torch power supply;
(b) electrically sensing the voltage present between said workpiece and said plasma arc torch and generating a first electrical signal representative thereof;
(c) electrically sensing the current flow between said workpiece and said plasma arc torch and generating a second electrical signal representative thereof comparable to said first electrical signal;
(d) electrically inverting one of said first and second electrical signals with respect to the other;
(e) electrically sensing the vector velocity of said movement of said plasma arc torch along said work surface and generating a third electrical signal representative thereof comparable to said first and second electrical signals and electrically summing said first, second and third electrical signals to produce a composite signal;
(f) electrically generating a fourth electrical signal equal in magnitude and opposite in sign to said composite signal at said selected spacing and said given velocity and summing said fourth electrical signal with said composite signal to produce an electrical control signal representative of both the sense and the amount of any change in said composite signal; and
(g) applying said electrical control signal to electromechanical means coupled to said plasma arc torch for moving said plasma arc torch toward said selected spacing from said work surface in response to said control signal.

5. The method as claimed in claim 4 wherein said step of electrically sensing the vector velocity of said movement of said plasma arc torch along said work surface comprises the steps of sensing the velocity of said torch in a first direction and generating an X electrical signal representative thereof; sensing the velocity of said torch in a second direction perpendicular to said first direction and generating a Y electrical signal representative thereof; and electrically summing said X electrical signal and said Y electrical signal with each other to produce said third electrical signal.

6. The method as claimed in claim 5 including the steps of electrically squaring each of said X and said Y electrical signals prior to the electrical summing thereof and electrically taking the square root of the electrically squared and summed X and Y electrical signals to produce said third electrical signal.

7. The method as claimed in claim 6 wherein said first electrical signal is a negative voltage becoming more negative as said voltage present between said workpiece and said plasma arc torch increases; said second signal is a positive voltage becoming less positive as said current flow between said workpiece and said plasma arc torch decreases; and said third signal is a negative voltage becoming less negative as said vector velocity of said movement of said plasma arc torch decreases.

8. The method as claimed in claim 6 including the step of electrically amplifying the electrically squared and summed X and Y electrical signals prior to electrically taking the square root thereof.

9. Apparatus for automatically maintaining a selected spacing between a plasma arc torch and the work surface of a workpiece during movement of said torch along said work surface at vector velocities equal to and less than a given vector velocity comprising:

(a) mechanical means for simultaneously moving said plasma arc torch in X and Y directions perpendicular to each other along the work surface of the workpiece at controllable velocities to establish vector velocities of movement of said torch along said work surface equal to and less than a given vector velocity;

(b) means establishing a plasma arc between said torch and said work surface of said workpiece including a DC power supply;

(c) means sensing the output voltage of said DC power supply and producing a first electrical signal representative thereof;

(d) means sensing the output current of said DC power supply and producing a second electrical signal representative thereof comparable to said first electrical signal;

(e) means inverting one of said first and second electrical signals with respect to the other;

(f) means for generating a third electrical signal representative of the vector velocity of movement of said plasma arc torch along said work surface of said workpiece;

(g) means for generating a fourth electrical signal equal in magnitude and opposite in sign to the sum of said first, second and third electrical signals at said selected spacing and given vector velocity between said plasma arc torch and said work surface of said workpiece;

(h) means summing said first, second, third and fourth electrical signals to produce an electrical control signal representative of the sum thereof;

(i) electromechanical means coupled to said plasma arc torch for moving said plasma arc torch toward and away from said work surface of said workpiece; and (j) means applying said electrical control signal to said electromechanical means.

10. Apparatus as claimed in claim 9 wherein said mechanical means for simultaneously moving said plasma arc torch in X and Y directions perpendicular to each other comprises a first rotating shaft producing movement of said torch in said X direction and a second rotating shaft producing movement of said torch in said Y direction, and said means for generating a third electrical signal representative of the vector velocity of movement of said plasma arc torch along said work surface of said workpiece comprises a pair of direct current tachometers each mechanically coupled to a different one of said first and said second rotating shafts and each having an output producing an electrical signal representative of the speed of rotation of the shaft coupled thereto whereby an X electrical signal proportional to velocity of movement of said plasma arc torch in the X direction and a Y electrical signal proportional to velocity of movement of said plasma arc torch in the Y direction are produced, which X and Y electrical signals are summed with each other to produce said third electrical signal.

11. Apparatus as claimed in claim 10 wherein said means for generating said third electrical signal comprises a pair of multiplier circuits each having an input and an output with the input of each electrically connected to the output of a different one of said pair of direct current tachometers, each of said pair of multiplier circuits being adapted to produce an electrical signal at the output thereof which is the square of the electrical signal at the input thereof, an electrical summing circuit having a pair of inputs and an output with each of the inputs thereof connected to the output of a different one of said multiplier circuits, said summing circuit being adapted to produce an electrical signal at said output thereof which is the sum of the electrical signals at the inputs thereof, and an electrical square root circuit having an input and an output with the input thereof connected to the output of said electrical summing circuit, said square root circuit being adapted to produce an electrical signal at the output thereof which is the square root of the electrical signal at the input thereof, whereby said third electrical signal is provided at said output of said square root circuit.

* * * * *